(12) United States Patent
Thoren et al.

(10) Patent No.: US 11,525,654 B2
(45) Date of Patent: Dec. 13, 2022

(54) POWER GENERATOR FOR A PROJECTILE (71) Applicant: THE CHARLES STARK DRAPER LABORATORY, INC., Cambridge, MA (US)

(72) Inventors: Glenn Richard Thoren, Chelmsford, MA (US); Bryan D. Teece, Boston, MA (US); Sean George, Boston, MA (US)

(73) Assignee: The Charles Stark Draper Laboratory, Inc., Cambridge, MA (US)

( * ) Notice: Subject to any disclaimer, the term of this patent is extended or adjusted under 35 U.S.C. 154(b) by 0 days.

(21) Appl. No.: 16/811,906

(22) Filed: Mar. 6, 2020

(65) Prior Publication Data
US 2020/0292287 A1 Sep. 17, 2020

Related U.S. Application Data

(60) Provisional application No. 62/817,335, filed on Mar. 12, 2019.

(51) Int. Cl.
*F42B 12/38* (2006.01)
*H02K 1/2786* (2022.01)

(52) U.S. Cl.
CPC ......... *F42B 12/382* (2013.01); *H02K 1/2786* (2013.01)

(58) Field of Classification Search
CPC ........ F42B 12/382; F42B 10/62; F42B 10/26; F42B 10/54; H02K 1/2786; H02K 7/183; Y02E 10/72; F42C 11/008
USPC ......................................... 473/570
See application file for complete search history.

(56) References Cited

U.S. PATENT DOCUMENTS

| | | | | |
|---|---|---|---|---|
| 3,973,500 A | * | 8/1976 | Brede | F42C 11/04 102/209 |
| 4,004,519 A | * | 1/1977 | Hopkins | F42C 11/04 102/208 |
| 5,271,328 A | * | 12/1993 | Boulais | F42C 11/04 102/207 |
| 2003/0044665 A1 | * | 3/2003 | Rastegar | F41J 2/00 429/402 |
| 2004/0099173 A1 | * | 5/2004 | Rector | F42B 12/382 102/501 |
| 2006/0283345 A1 | * | 12/2006 | Feldman | F42B 12/365 102/430 |
| 2010/0285721 A1 | * | 11/2010 | Ma | F42B 12/42 446/485 |
| 2011/0041719 A1 | * | 2/2011 | Ivtsenkov | F42C 11/008 102/209 |

\* cited by examiner

*Primary Examiner* — Robert P Bullington
*Assistant Examiner* — Stephen Alvesteffer
(74) *Attorney, Agent, or Firm* — Brooks Kushman, P.C.

(57) ABSTRACT

A projectile includes a body and a power generator secured to the body. The power generator includes a stator and a ring including at least one magnet and extending radially around and freely rotatable about at least a portion of the stator. A power generator for a projectile is also provided.

20 Claims, 5 Drawing Sheets

POWER GENERATOR FOR A PROJECTILE

CROSS-REFERENCE TO RELATED APPLICATION

This application claims priority under 35 U.S.C. § 119(e) to U.S. Provisional Application Ser. No. 62/817,335 titled "POWER GENERATOR FOR A PROJECTILE" filed Mar. 12, 2019, which is incorporated herein by reference in its entirety for all purposes.

SUMMARY

According to an aspect of the present disclosure, a projectile includes a body and a power generator secured to the body. The power generator includes a stator and a ring comprising at least one magnet extending radially around and freely rotatable about at least a portion of the stator.

In some embodiments, the power generator is configured to generate power when a rotational velocity of the ring is different from a rotational velocity of the stator.

In some embodiments, the projectile further includes at least one aerodynamic feature projecting from the ring.

In some embodiments, an output of the power generator is at least 2 watts.

In some embodiments, the ring is mounted on at least one bearing secured to the body.

In some embodiments, the projectile includes at least one wireless transmitter connected to the power generator.

In some embodiments, the projectile includes at least one light emitting diode electrically connected to the power generator.

In some embodiments, the projectile includes a controller connected to the at least one light emitting diode, and the controller is configured to control timing of illumination of the at least one light emitting and/or receiving diode to a predetermined time period.

In some embodiments, the predetermined time period is at least about 100 milliseconds.

In some embodiments, the at least one light emitting diode emits light at a predetermined frequency.

In some embodiments, the at least one light emitting diode emits at least one of green light and red light.

In some embodiments, the projectile includes a lens secured to the body rearward of the at least one light emitting diode.

In some embodiments, the lens focuses light from the at least one light emitting diode to a cone having an opening angle of about 15°.

In some embodiments, the projectile includes at least one baffle wall positioned rearward of the lens.

In some embodiments, the projectile includes a tail structure rigidly connected to the body and positioned rearward of the ring.

In some embodiments, the projectile includes at least one projectile according to claim 1.

According to another aspect of the present disclosure, a system includes a projectile launching device; and a plurality of projectiles comprising at least one projectile according to claim 1.

In some embodiments of the system, the projectile launching device is a gun.

According to another aspect of the present disclosure, a system includes a projectile launching device and a plurality of projectiles. The plurality of projectiles includes at least one projectile that includes a body and a power generator secured to the body. The power generator includes a stator and a ring comprising at least one magnet extending radially around and freely rotatable about at least a portion of the stator. The projectile further includes at least one electronic component electrically connected to the power generator. In some embodiments, the at least one electronic component includes at least one light emitting diode electrically connected to the power generator. The at least one light emitting diode emits light at a predetermined frequency, that is only perceptible to an operator of the system.

DESCRIPTION OF THE DRAWINGS

The accompanying drawings are not intended to be drawn to scale. For purposes of clarity, not every component may be labeled in the drawings.

In the drawings.

DETAILED DESCRIPTION

The present disclosure relates generally to a compact power generator for a projectile that travels through the air.

There are disadvantages to including stored power sources on airborne objects. A significant detriment to airborne platforms that would employ electronics on board for a large variety of functions such as sensing, maneuvering, communications and transmitting signals is that batteries are often inadequate. Batteries can be too large, carry insufficient energy, be slow to provide power, provide inadequate power at critical times, be sensitive to thermal changes, and deteriorate over time while in storage. Coin batteries, thermal batteries, super capacitors, and power conversion systems such as solar cells and magnetic induction coils are all limited by their power capacity, survivability under high gravitational force equivalents (high g-forces), storage life, energy density, energy capacity, and thermal sensitivity.

According to one aspect of the present disclosure, a power generator is provided for an object that travels through the air. In some embodiments, the object that travels through the air may be an unmanned aerial vehicle, a missile, a bullet, or another object. Although a power generator of the present disclosure may be used in various objects, the discussion below relates generally to a power generator for a projectile. Embodiments of power generators described herein in relation to a projectile may be implemented on other objects.

A power generator of the present disclosure generates power during flight of the projectile. The power generator does not require storage of power on the projectile prior to launch of the projectile. For example, a projectile of the present disclosure can provide power to a powered element on the projectile without relying on a charge stored in a battery, a capacitor, or another power storage means prior to launch of the projectile.

Projectiles of the present disclosure can be stored. In some embodiments, projectiles of the present disclosure may be stored for a time period that exceeds chemical battery and thermal battery potential. In some embodiments, projectiles of the present disclosure may be stored for more than a year. By selecting materials of the power generator and preparing the power generator such that corrosion or other environmentally induced degradation of the dimensions does not interfere with the performance when called upon, the power generator of the present disclosure will not degrade.

In general, power generators of the present disclosure rely on a two-piece assembly which allows a differential spin rate between the two pieces as the projectile exits a barrel. The two-piece assembly includes a rotor and a stator, and generates power based on relative rotation of the rotor and the stator. In some embodiments, the rotor includes a main body of a projectile having a solid front section, an electronics section, and a powered element. In some embodiments, the powered element is a light emitting diode (LED) with an illumination window.

The present disclosure provides a projectile that is reliable, has a low manufacturing cost, has a long storage life, and provides a high-performance power source (without requiring batteries) that is scalable for projectiles of all sizes.

The body has an outer shape that is generally formed as a projectile. In some embodiments, the body is in the form of a bullet. In some embodiments, the body is configured for being launched from a rifled barrel. In some embodiments, the body is configured for being launched from another device, such as a barrel that has a smoothbore or is otherwise non-rifled.

In embodiments in which the body is configured for being launched from a rifled barrel, the body spins about an axis as the body travels through the barrel due to the engagement of the driving bands on the body with the driving bands of the rifling. In some embodiments, the driving bands on the body of the projectile include cannelures, which are grooves defined in the body of the projectile. In embodiments in which the body is configured for being launched from a smoothbore barrel, the body may exit the smoothbore barrel without spinning. In such embodiments, aerodynamic features cause at least a portion of the projectile to spin.

In some embodiments in which the body is in the form of a bullet, the bullet has a diameter between about 5 millimeters and about 50 millimeters. In some embodiments, the bullet has a diameter between about 10 millimeters and about 40 millimeters. In some embodiments, the bullet has a diameter between about 20 millimeters and about 30 millimeters. In some embodiments, the bullet has a diameter of about 30 millimeters. In one example, the bullet has a diameter of about 7.62 millimeters.

The body is configured for enduring aerodynamic forces. Some mechanical forces may be launch forces that are represented as g-forces. In some embodiments, the projectile can function with a launch force of over 100,000 times the gravitational force on Earth's surface (over 100,000 G). In some embodiments, the projectile can function with a launch force of up to about 73,000 G. In some embodiments, the projectile can survive and function with a launch force of up to about 50,000 G. In some embodiments, the projectile can survive and function with a launch force of up to about 25,000 G.

The body may be configured to minimize drag on the projectile when the projectile is traveling through the air. In some embodiments, a cone angle of the tip of the projectile is selected to minimize drag of the projectile. In some embodiments, a cone angle of the tail of the projectile is selected to minimize drag of the projectile.

A power generator is secured to the body. The power generator includes a rotor and a stator that are configured to generate power due to a rotational velocity of the rotor relative to the stator.

In some embodiments, the stator may be rotationally fixed to the body, and the rotor is not. In some embodiments, the stator is part of the body and is integrally formed with the body. In some embodiments, the rotor may be rotationally fixed to the body, and the stator is not. In some embodiments, the rotor is part of the body and is integrally formed with the body.

As noted above, the body of the projectile may spin about an axis during flight of the projectile. In embodiments in which the stator is rotationally fixed to the body, the stator spins at the same rate as the body about an axis during flight of the projectile.

The stator includes at least one wire coil that is configured to conduct a current in response to a changing magnetic field caused by movement of the rotor relative to the stator. In some embodiments, the stator includes a plurality of wire coils.

The wire coils may be selected to suit the application. In some embodiments, the wire is fine wire with a sufficient number of windings to provide a desired power output. A larger gauge wire is capable of conducting a greater current. In some embodiments, the wire has a standard wire gauge of between 10 and 50. In some embodiments, the wire has a standard wire gauge of between 20 and 50. In some embodiments, the wire has a standard wire gauge of between 30 and 50. In some embodiments, the wire has a standard wire gauge of between 40 and 50. In one example, the wire has a standard wire gauge of 43.

The wire coils may be made of any material useful for conducting current. In some embodiments, the wire is copper.

To allow the rotor to rotate freely with respect to the stator, at least one bearing assembly connects the rotor to the stator. In some embodiments, more than one bearing assembly connects the rotor to the stator.

The bearing assembly may be selected to withstand a high rotational velocity of the rotor with respect to the stator. In some embodiments, the bearing assembly includes ball bearings that are capable of withstanding rotational velocities of up to about 120,000 revolutions per minute.

The bearing assembly may include a ball bearing, a roller bearing, or another type of bearing. The bearing assembly may similar, for example, to those bearings that are typically used in dental drills or in a vacuum cleaner.

In some embodiments, the bearings are made of metal, ceramic, and/or another material. In some embodiments, the bearings include metallic ball bearings. In some embodiments, the bearings include ceramic ball bearings.

In some embodiments, the bearing assembly is concealed within the projectile. In some embodiments, the bearing assembly is concealed within the projectile by the rotor extending around the bearing assembly. In some embodiments, the bearing assembly is concealed within the projectile by the rotor and the body of the projectile.

The rotor is mounted on the bearing assembly and is thereby secured to the body and configured to rotate relative to the stator.

In some embodiments, the rotor is configured to rotate on an axis that is perpendicular to the direction of flight of the projectile. In such embodiments, the rotor includes aerodynamic features similar to a paddle wheel. In some embodiments, the rotor is configured to rotate on an axis that is parallel to the direction of flight of the projectile.

To generate a current in the coil(s) of the stator, the rotor includes at least one magnet. In some embodiments, the rotor includes a plurality of magnets. In some embodiments, the rotor includes an array of magnets that are circumferentially spaced apart on the rotor and secured to the rotor.

In some embodiments, the rotor is in the form of a ring. In some embodiments, the ring extends radially around and is freely rotatable about at least a portion of the stator. In some embodiments, the rotor is an external ring. In some embodiments, the rotor is an internal ring.

In embodiments in which the rotor is an external ring, the rotor generates power by interacting with the airstream around the projectile. In some embodiments, the external ring interacts with the airstream due to at least one aerodynamic feature, such as a strake or an embossed feature, on an outer surface of the external ring.

The external ring is capable of generating long duration sustained power. While the projectile is in flight, the external ring interacts with the aerodynamics and air stream so that the external ring spins relative to the body of the projectile. The external ring spins with respect to the rotation of the coil(s) of the stator to create power, effectively acting as an alternator.

In embodiments in which the rotor is an internal ring, the rotor generates power when rotational acceleration or deceleration is applied to the body. This second form of the rotor is a totally internal "inertial mass" that is mostly decoupled from the projectile as the projectile travels down the barrel and interfaces with the driving bands to spin the body for gyroscopic stability. Due to the mass of the internal ring and the friction between the internal ring and the body, the internal ring does not "spin up" as fast as the body does and thereby generates power. However, this power generation lasts for a shorter period of time than with the external ring, due to the differential angular velocities of the main body and the magnet array and lack of aerodynamic forces acting on the internal ring to drive the internal ring. Over time, frictional forces between the body and the internal ring eventually create sufficient force to bring the internal ring up to the rotational velocity of the main body unless a retarding mechanism delays that "drag" between the internal ring and the body.

The flight controls are configured to interact with the airstream over the projectile to spin the rotor relative to the stator.

When the rotor enters the airstream, the rotor is spun at a different rate than the non-spinning body of the projectile, producing power.

A projectile according to the present disclosure may include flight controls. Such flight controls may be particularly useful in embodiments in which the projectile is launched from a smoothbore barrel. In some such embodiments, the projectile is saboted in a disposable container so that the container falls away.

Such non-spinning projectiles could be controlled by flight controls. The flight controls may include fins or canards or other aerodynamic mechanisms that provide a desired trajectory and stability but do not spin for gyroscopic stability, similar to control of missiles or arrows. The stability of such projectiles comes from the aerodynamic structure not spinning.

In some embodiments, the flight controls may include a tail structure rigidly connected to the body and positioned rearward of the power generator. In some embodiments, the flight controls may include fins positioned rearward of the power generator.

For each of the rotor structures described herein, power is generated due to a relative rotational velocity of the rotor with respect to the stator. That is, power is generated by the rotor and the stator when the rotational velocity of the rotor is different from the rotational velocity of the stator. The stator may be spinning because the projectile traveled through a rifled barrel. The rotor spins independently from the stator, so the rotor may spin at a different rate or in a different direction than the stator. In some embodiments, the relative rotation is provided by the rotor spinning less than the stator. In some embodiments, the relative rotation is provided by the stator spinning less than the rotor. In some embodiments, the relative rotation is provided by the rotor and stator spinning in opposite directions.

The power generated depends on how the alternator was designed. For example, the power generator depends on how the magnets and the windings of the alternator are arranged. The power generated also depends on the relative rotational velocity of the rotor and stator. The greater the relative rotational velocity is, the more power is generated. In some embodiments, the relative rotational velocity is between about 50,000 revolutions per minute and about 150,000 revolutions per minute. In some embodiments, the relative rotational velocity is between about 60,000 revolutions per minute and about 140,000 revolutions per minute. In some embodiments, the relative rotational velocity is between about 70,000 revolutions per minute and about 130,000 revolutions per minute. In some embodiments, the relative rotational velocity is between about 80,000 revolutions per minute and about 120,000 revolutions per minute.

For example, in some embodiments, the body of the projectile is formed as a .50 caliber bullet, and the body rotates at a rate of up to 120,000 revolutions per minute due to the rifling of the barrel. In some such embodiments, the rotor is in the form of an external ring. The rotor may spin at the same rate and in the same direction as the body due to friction between the body and the rotor. After launch of the bullet, the rotational velocity of the external ring is substantially reduced by aerodynamic features on the external ring as the projectile enters the airstream. From a fixed perspective in a coordinate system through which the projectile travels, the external ring spins more slowly than the stator secured to the main body. This creates a flying alternator because of the differential spin rates of the two sections. A voltage is generated via a coil on the stator by the magnets in or on the rotor and is then rectified and regulated to meet the required voltage and current.

When the relative rotational velocity is nonzero, the power generator outputs power. The power that is output by the power generator can be used for many applications. Additionally, the power can be stored. Although the power generator of the present disclosure does not require a device that stores power prior to launch of the projectile, the power generator can include a power storage device for storing power that is generated after launch of the projectile.

The power generator may be configured to provide a power output that is sufficient to power any powered element secured to the projectile. For example, the power generator may provide power to operate electronics, or control surfaces or provide communications information via telemetry. Some powered elements may require 2 watts or less. For example, an LED may require less than 2 watts. In some embodiments, the power generated on board is in excess of that needed to power the LEDs or lasers.

In some embodiments, the power output is at least about 1 watt. In some embodiments, the power output is between about 1 watt and about 500 watts. In some embodiments, the power output is between about 1 watt and about 250 watts. In some embodiments, the power output is between about 1 watt and about 100 watts. In some embodiments, the power output is between about 2 watts and about 100 watts. In some embodiments, the power output is between about 10 watts and about 90 watts. In some embodiments, the power output is between about 20 watts and about 80 watts. In some embodiments, the power output is between about 30 watts and about 70 watts.

In one example, the power output is at least about 2 watts.

In other examples, the power source delivers at least 3.3 volts and 50-1000 milliamps.

Power generators of the present disclosure are capable of having a high energy density, as measured by the power output of the power generator relative to the volume of the power generator's components. Power generators of the present disclosure are capable of providing more power than a battery could for a given application. For example, a power generator of the present disclosure that is on a .50 caliber bullet is capable of outputting greater power than a battery that is suitable for mounting in a .50 caliber bullet. Given a volume constraint on a projectile, power generators of the present disclosure provide greater energy and duration of energy availability than batteries. In some embodiments, the projectile is in the form of a .50 caliber bullet, and the power generator of the projectile produces more than 50 watts of power. In some embodiments, the projectile is in the form of a .50 caliber bullet, and the power generator of the projectile produces between about 50 watts and about 70 watts of power. In some embodiments, the projectile is in the form of a bullet having a diameter of 30 millimeters, and the power output is about 500 watts. In some embodiments, the projectile is in the form of a bullet having a diameter of 20 millimeters and the power output is about 100 watts.

The power from the power generator may be provided to at least one powered element included in the projectile or on a surface of the projectile. The powered element may include signal transmitters, signal receivers, communication devices, controllers for command detonation of projectiles, data infiltration and exfiltration devices, LEDs that act as tracers for bullets, sensor systems for chemicals and biologicals that are in turn transmitted from the projectile back to the firing location, maneuvering technology, and other powered elements. In some embodiments, the powered element includes radio frequency (RF) transmitters for RF telemetry for images or the output from sensors that detect the presence of noxious or lethal chemicals while in flight. In some embodiments, where more power is available from the power generator, the powered element may include devices for electronic disruption or the delivery of messages electronically while in flight. New technology and sensors can be miniaturized and embedded within projectiles and other platforms that travel in air.

Embodiments in which the powered element includes an LED can be used to form a tracer round. The powered element may include one or more LED(s) that is/are electrically connected to the power generator.

In some embodiments, an LED emits light at a predetermined frequency. In some embodiments, an LED emits green light and/or red light. In some embodiments, an LED emits a green light that may be seen in daylight. In some embodiments, an LED emits a light frequency that is not normally visible to the human eye. In some embodiments, an LED emits light having a wavelength that is visible only with specialized eyewear or viewers. In some embodiments, an LED is configured to emit light at a variety of optional wavelengths, to provide greater visibility of a tracer round that is only observable to the shooter and individuals near the shooter. In some embodiments, the tracer round is only observable to the shooter and to individuals near the shooter who are equipped with eyewear or other devices that allow them to view the light from the LED.

By using one or more LEDs that emit green light or red light, "undetectable" tracer rounds or rounds can be lit so they can be seen up to a kilometer or more in the daytime. For example, an LED may emit green light having a wavelength between 520 nanometers and 560 nanometers because it is visible in the daylight.

In some embodiments, the LED may be secured adjacent a baffle structure that prevents light from the LED from being transmitted radially from the projectile. This capability prevents the tracers and their trajectory or the point of origin of the rounds from being seen from the side and hence revealing the locations of the "shooter" who may be in "concealment," so that the muzzle flash is less likely to be seen.

In some embodiments, the baffle includes at least one baffle wall that is positioned rearward of the lens. The baffle wall(s) prevent light from leaking in a radial direction from the projectile. In some embodiment, the baffle includes baffle walls that form a grid pattern. In some embodiments, the baffle walls may form a rectangular grid pattern.

In some embodiments, the LED light is focused by a lens that is positioned adjacent the LED. In some embodiments, the lens is secured to the body rearward of the at least one light emitting diode. In some embodiments, the lens focuses light from the LED to a cone having an opening angle of between about 5° to about 45°. In some embodiments, the lens focuses light from the LED to a cone having an opening angle of between about 10° to about 30°. In some embodiments, the lens focuses light from the LED to a cone having an opening angle of between about 10° to about 25°. In some embodiments, the lens focuses light from the LED to a cone having an opening angle of between about 10° to about 15°. In some embodiments, the lens focuses light from the LED to a cone having an opening angle of about 15°.

In some embodiments, the powered element includes at least one wireless transmitter that is electrically connected to the powered generator.

In some embodiments, the transmitter is configured for providing a broadband connection, an RF connection, RF disruption, and/or for transmitting another signal, such as telemetry. In some embodiments, the transmitter is configured for burst communication.

In some embodiments, the transmitter can enable communication between two other devices, by relaying a signal from a first device to a second device.

In some embodiments, the transmitter can transmit a range of 2 kilometers rearward of the projectile and 5 kilometers ahead of the projectile.

In some embodiments, the transmitter can transmit information related to flight path, position, velocity, atmospheric conditions through which the projectile is passing.

Circuitry connects the power output to a powered element. In some embodiments, the circuitry includes a controller for controlling one or more powered elements.

In some embodiments, the circuitry includes a controller. In some embodiments, the controller is within the power generator. In some embodiments, the controller is within the powered element.

In some embodiments, the controller is configured to control activation of a powered element. The controller may be configured to control the timing of illumination of at least one LED.

By delaying illumination of an LED on the projectile, the controller can prevent detection of the shooter of the projectile. By delaying illumination of an LED on the projectile until a predetermined time period has elapsed after launch of the projectile, the light from the LED is less likely to backlight the shooter, and third parties viewing the projectile are less likely to be able to determine the location of the shooter. This delay also prevents third parties from seeing the projectile during flight of the projectile.

In some embodiments, the controller is configured to delay illumination of an LED by a time period of between about 50 milliseconds and 300 milliseconds. In some embodiments, the controller is configured to delay illumination of an LED by a predetermined time period of between about 100 milliseconds and 250 milliseconds. In some embodiments, the controller is configured to delay illumination of an LED by a predetermined time period of between about 100 milliseconds and 200 milliseconds.

In some embodiments the controller is configured to delay illumination of an LED by a time period of at least about 100 milliseconds after launch of the projectile.

According to some embodiments, a plurality of projectiles can be provided. Where a user wishes to include specialized projectiles, such as tracer bullets, within the plurality of projectiles, a fraction of the plurality of projectiles may be embodiments of projectiles having a power generator of the present disclosure. For example, in some embodiments, a plurality of projectiles are provided in which at least one projectile in the plurality of projectiles has a power generator of the present disclosure.

In some cases, it may be desirable to provide a plurality of projectiles in which each projectile is a projectile as described in the present disclosure.

According to another aspect of the present disclosure, a system is provided. In some embodiments, the system includes a projectile launching device and at least one projectile having a power generator of the present disclosure. In some embodiments, the system includes a projectile launching device and a plurality of projectiles that includes at least one projectile having a power generator of the present disclosure.

According to another aspect of the present disclosure, a system is provided for launching one or more of the projectiles of the present disclosure.

In some embodiments, the system includes a projectile launching device, such as a gun. The gun may have a barrel selected for the diameter of the projectile. For example, for a projectile that is in the form of a .50 caliber round, any platform that can fire a standard .50 caliber round can fire the projectile.

Systems of the present disclosure may include one or more projectiles having a power generator of the present disclosure. In some embodiments, the system includes a plurality of projectiles comprising at least one projectile having a power generator of the present disclosure. In some embodiments, one or more of the projectiles that has a power generator has a powered element that is configured to provide an output that is detectable by the shooter. For example, one or more of the projectiles may have an LED that emits a light that is detectable by the shooter and/or may have an RF transmitter that emits a signal that is only detectable by the shooter.

In some embodiments, the system includes a detection device, such as eyewear or a viewer configured to detect certain light wavelengths and/or a RF receiver. The detection device may be provided to the shooter to detect a light wavelength and/or signal emitted by the projectile.

The power generator of the present disclosure can be scaled in size for many varieties of applications and projectiles. It can also be part of other flight platforms such as glide weapons and aircraft accessories. The mechanical portions can be made to be tolerant of high g-forces and able to be stored without deterioration in performance.

Various embodiments of projectiles according to the present disclosure were constructed and were tested to evaluate their performance. The tested embodiments included projectiles with onboard electronics and power generators. The power generators generated sufficient power to operate the onboard electronics. For example, tested projectiles included LEDs and power generators that illuminated the LEDs.

PROPHETIC EXAMPLE 1

One embodiment of a projectile according to the present disclosure is shown in FIGS. 1-4. FIGS. 1-4 show an example of a projectile, generally indicated at 10, having a power generator, generally indicated at 12, according to the present disclosure.

The projectile 10 includes a body 14 that is in the shape of a bullet. The body 14 has an aerodynamic shape configured for desired flight characteristics of the bullet.

As noted above, the projectile diameter could be any of a wide variety of diameters. In this example, the projectile may have a diameter of 5.56 millimeters or 7.62 millimeters.

The power generator 12 is secured to the body 14. The power generator includes a stator 16 and a ring-shaped rotor 18. The power generator 12 is configured to output power during flight of the projectile 10.

Figure 1:
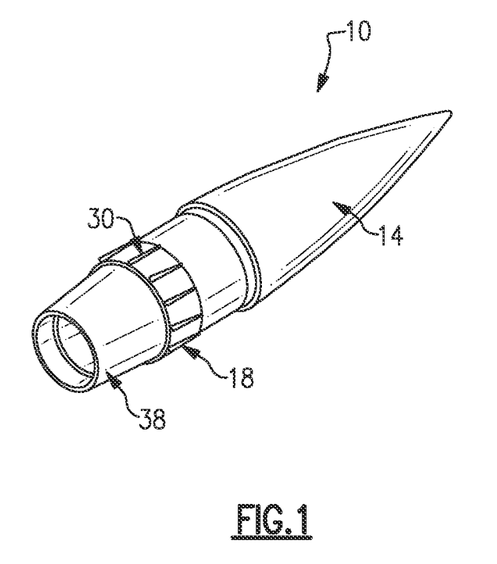
FIG. 1 illustrates a perspective view of a projectile having a first embodiment of a power generator of the present disclosure.
Figure 2:
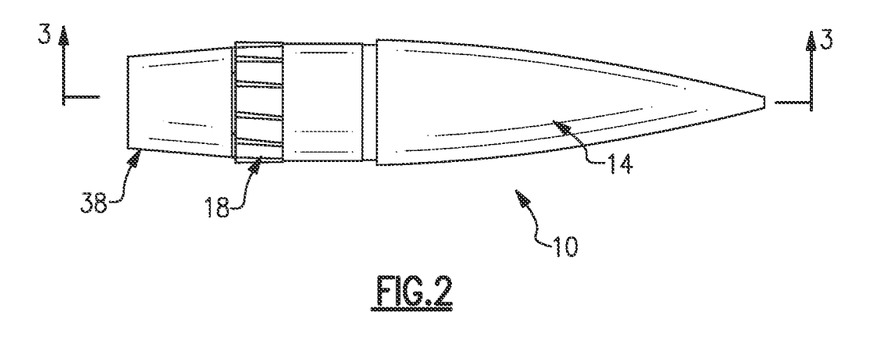
FIG. 2 illustrates a side view of the projectile of FIG. 1.
Figure 3:
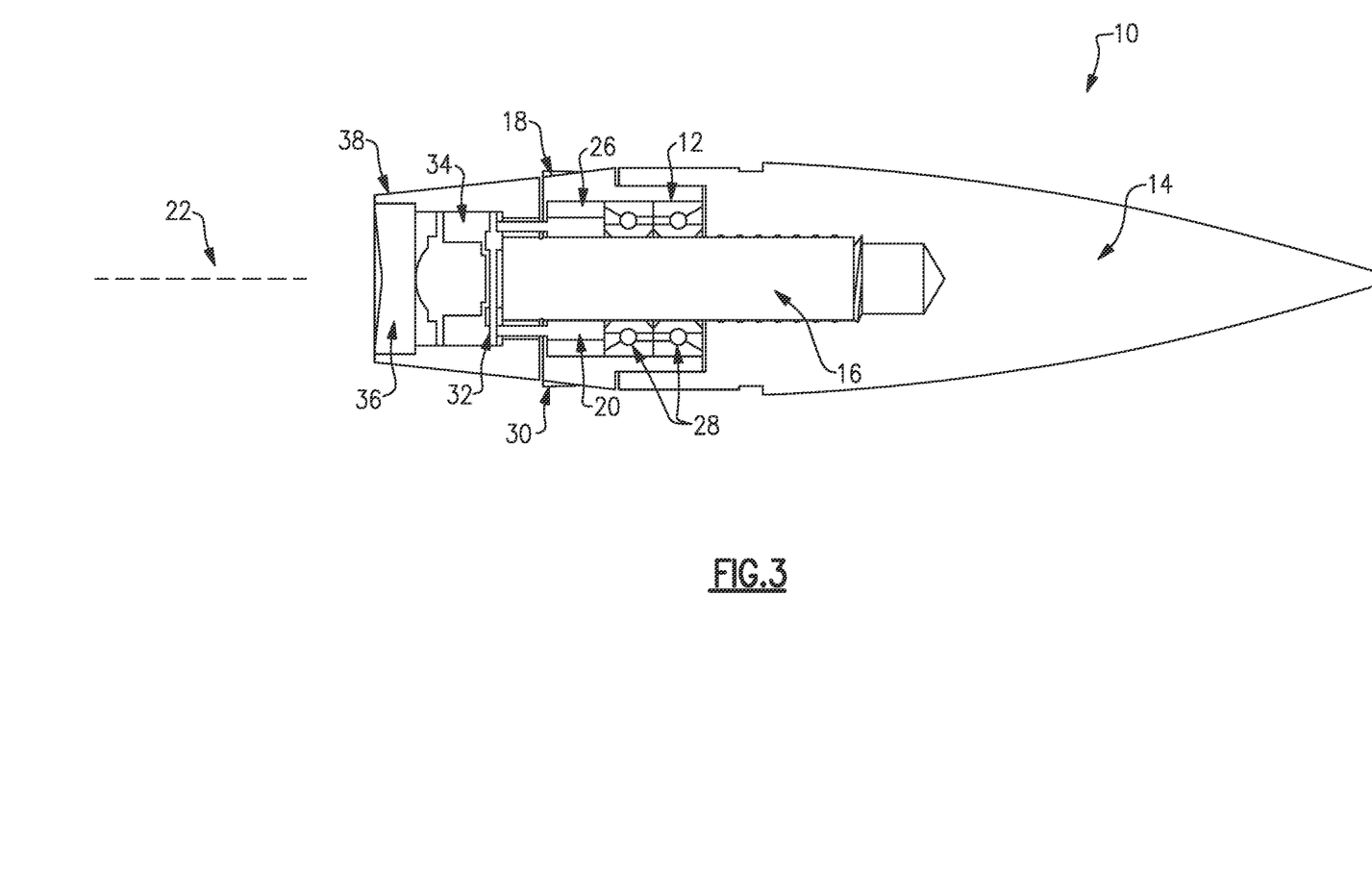
FIG. 3 illustrates a partial cross section of the projectile of FIG. 1 through the line 3-3 in FIG. 2.
Figure 4:
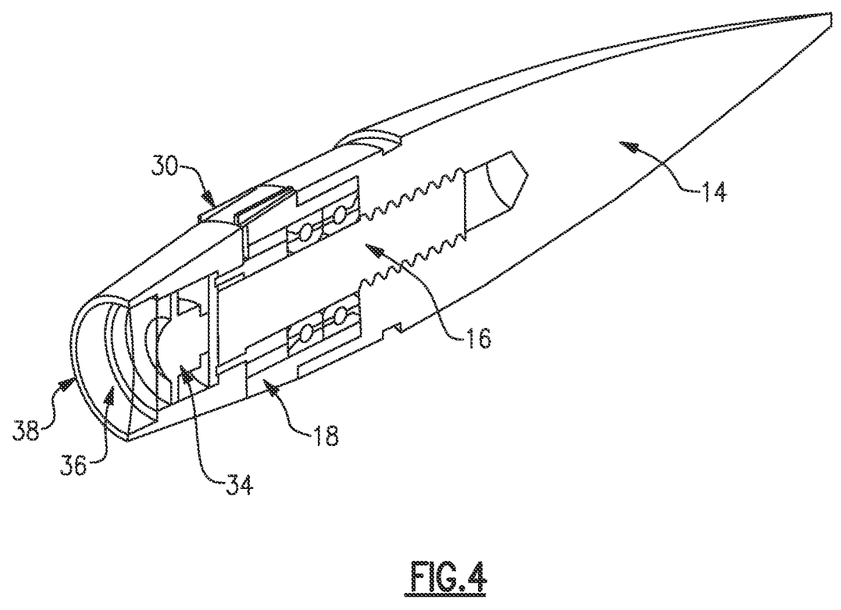
FIG. 4 illustrates a perspective cross sectional view of the projectile of FIG. 1 through the line 3-3 in FIG. 2.

The stator 16 is secured to the body 14, and includes a plurality of wire coils 20. The coils 20 are centered along a central axis 22 of the body 14.

The rotor 18 is a ring that is centered about the axis 22 of the body 14. The rotor 18 includes magnets 26. The magnets are circumferentially spaced along the rotor 18. The rotor 18 extends radially around and is rotatable about the stator 16.

To allow rotation of the rotor 18 with respect to the stator 16, the rotor 18 is mounted on two bearings 28 that are centered about the axis 22 of the body 14.

The power generator 12 outputs power when a rotational velocity of the ring of the rotor 18 is different from a rotational velocity of the coils 20 of the stator 16. The rotation of the magnets 26 of the rotor 18 relative to the coils 20 of the stator 16 induces a current in the coils 20. When the body 14 travels through a rifled barrel, the rifled barrel causes the body 14 to spin. When the projectile 10 exits the barrel, the body 14 continues to spin. Aerodynamic features 30 on the rotor 18 cause the rotor 18 to rotate at a different speed than, or in an opposite direction of, the body 14. Because the stator 16 is rotationally fixed to the body 14, this results in a rotational velocity of the rotor 18 relative to the stator 16.

The power generator 12 is expected to output between 0.5 watts and 10.0 watts. The amount of power generated depends on the aerodynamic features of the projectile and may vary during the flight of the projectile.

The power generator 12 may be connected to any of a variety of powered elements so that power is delivered from the power generator to the powered elements. The coils 20 are connected to circuitry, including printed circuit board 32, which includes at least one processor. The processor(s) are configured to control the powered elements, such as LED 34. The LED 34 is electrically connected to the power generator 12.

The LED 34 emits light at a predetermined frequency. In this example, the LED emits green light having a wavelength of 532 nanometers, which is visible in daylight. This light appears brilliant even in daytime.

To focus the light, a lens 36 is secured to the body 14 rearward of the LED 34. The lens 36 focuses the light to a cone having an opening angle of 15°.

To further prevent the light from leaking in a radial direction, a baffle wall 38 is positioned rearward of the lens.

EXAMPLE 2

Figure 5:
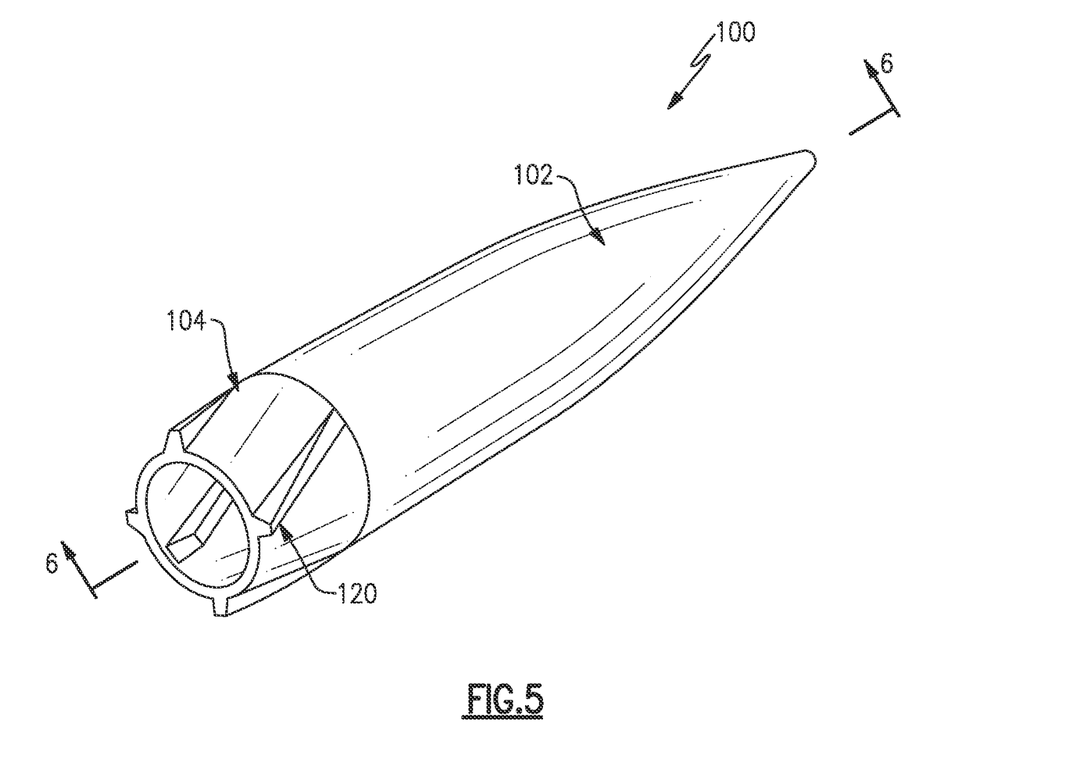
FIG. 5 illustrates a perspective view of a projectile having a second embodiment of a power generator of the present disclosure.
Figure 6:
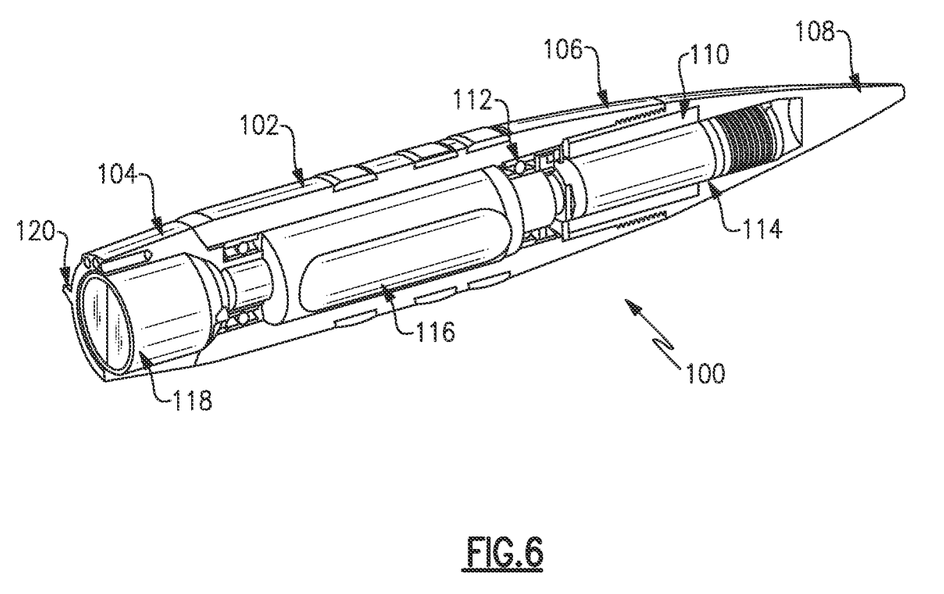
FIG. 6 illustrates a partial cross sectional schematic view of the projectile shown in FIG. 5 through the line 6-6 in FIG. 5.

To demonstrate the feasibility of a power generator for a projectile, a .50 caliber projectile 100 was constructed as shown in FIGS. 5-6. The projectile 100 had a rotor 102 and a stator 104. The projectile 100 was a .50 caliber projectile, meaning it was a projectile that had a diameter of 0.50 inch (about 12.7 millimeters). The projectile had a length of 2.8 inches (about 71 millimeters). The rotor 102 included a main body portion 106 and a nose portion 108 that were rotationally fixed to each other. Magnets 110 were secured to the nose portion 108.

Bearings 112 connected the rotor 102 to the stator 104 to enable the rotor 102 to rotate freely with respect to the stator 104.

The power generator of the projectile generated power. Wire coils 114 were secured to the stator so that rotation of the rotor 102 relative to the stator 104 caused the magnets 110 to rotate about the wire coils 114. The projectile was launched and generated at least 10 watts of power.

The stator included circuitry 116 that was connected to the wire coils 114. The circuitry included a controller for directing power to a powered element 118 that was secured to the stator 104. The powered element 118 included an optical receiver.

The stator 104 included a plurality of aerodynamic features, such as strakes, 120 for effecting rotation of the stator 104 with respect to the rotor 102.

Having thus described several aspects of at least one embodiment, it is to be appreciated that various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. A projectile configured for being launched from a rifled barrel, the projectile comprising:
    a bullet-shaped body having a solid front portion and an outer diameter configured for engaging driving bands of a rifled barrel when the bullet-shaped body travels through a rifled barrel, thereby imparting rotation of the bullet-shaped body about its central axis; and
    a power generator positioned rearward of and secured to the solid front portion of the bullet-shaped body, the power generator comprising
        a stator; and
        a rotor extending radially around and freely rotatable about at least a portion of the stator; and
        at least one aerodynamic feature projecting from the rotor that cause the rotor to rotate about the central axis at a different speed of the bullet-shaped body or in an opposite direction of the bullet-shaped body,
        wherein the at least one aerodynamic feature of the rotor is positioned rearward of the solid front portion of the body.

2. The projectile of claim 1, wherein the power generator is configured to generate power when a rotational velocity of the rotor is different from a rotational velocity of the stator.

3. The projectile of claim 1, wherein the projectile is in the form of a 50 caliber bullet and an output of the power generator is 0.5 to 10 watts.

4. The projectile of claim 1, wherein the rotor is mounted on at least one bearing.

5. The projectile of claim 1, further comprising at least one wireless transmitter connected to the power generator.

6. The projectile of claim 1, further comprising at least one light emitting diode electrically connected to the power generator.

7. The projectile of claim 6, further comprising
    a controller connected to the at least one light emitting diode, the controller being configured to control timing of illumination of the at least one light emitting diode to a predetermined time period.

8. The projectile of claim 7, wherein the predetermined time period is at least about 100 milliseconds.

9. The projectile of claim 6, wherein the at least one light emitting diode emits light at a predetermined frequency.

10. The projectile of claim 9, wherein the at least one light emitting diode emits at least one of green light and red light.

11. A system comprising:
    a projectile launching device; and
    a plurality of projectiles comprising at least one projectile according to claim 10, wherein the predetermined frequency is only perceptible to an operator of the system.

12. The projectile of claim 6, further comprising a lens secured rearward of the at least one light emitting diode.

13. The projectile of claim 12, wherein the lens focuses light from the at least one light emitting diode to a cone having an opening angle of about 15°.

14. The projectile of claim 13, further comprising at least one baffle wall positioned rearward of the lens.

15. The projectile of claim 1, further comprising a tail structure rigidly connected to the body and positioned rearward of the rotor.

16. A plurality of projectiles comprising at least one projectile according to claim 1.

17. A system comprising:
    a projectile launching device; and
    a plurality of projectiles comprising at least one projectile according to claim 1.

18. The system of claim 17, wherein the projectile launching device is a gun including a rifled barrel.

19. The projectile of any of claim 1, wherein the power generator provides power to a powered element without relying on a charge stored in a battery.

20. The projectile of claim 19, the solid front section having an aerodynamic shape and a cone angle selected to minimize drag of the projectile.

* * * * *